US009356936B2

(12) United States Patent
Negrea et al.

(10) Patent No.: US 9,356,936 B2
(45) Date of Patent: May 31, 2016

(54) METHOD AND APPARATUS FOR MANAGING ACCESS TO ELECTRONIC CONTENT

(71) Applicant: Intralinks, Inc., New York, NY (US)

(72) Inventors: Alex Negrea, Constanta (RO); Dan Alexandru Gentea, Constanta (RO); Clement Cazalot, Montpellier (FR); Uli P. Mittermaier, Boston, MA (US)

(73) Assignee: Intralinks, Inc., New York, NY (US)

( * ) Notice: Subject to any disclaimer, the term of this patent is extended or adjusted under 35 U.S.C. 154(b) by 206 days.

(21) Appl. No.: 14/044,765

(22) Filed: Oct. 2, 2013

(65) Prior Publication Data

US 2015/0096053 A1    Apr. 2, 2015

(51) Int. Cl.
*G06F 21/62* (2013.01)
*H04L 29/06* (2006.01)
*G06F 21/10* (2013.01)

(52) U.S. Cl.
CPC ............ *H04L 63/101* (2013.01); *G06F 21/10* (2013.01); *G06F 21/6236* (2013.01); *G06F 2221/2145* (2013.01); *H04L 2463/101* (2013.01)

(58) Field of Classification Search
CPC ..... G06F 21/62; G06F 21/10; G06F 21/6236; G06F 2221/2145; G06F 2221/2107
USPC .................................. 726/20, 22, 24, 26, 28
See application file for complete search history.

(56) References Cited

U.S. PATENT DOCUMENTS

| 2008/0250508 | A1* | 10/2008 | Montague et al. ............... 726/28 |
| 2012/0144195 | A1  | 6/2012  | Nair et al. |
| 2012/0233019 | A1  | 9/2012  | Hwang et al. |
| 2012/0284802 | A1  | 11/2012 | Hierro et al. |
| 2012/0291142 | A1  | 11/2012 | Seleznev et al. |

FOREIGN PATENT DOCUMENTS

| WO | 2012050367 A2 | 4/2012 |
| WO | 2015051017 A1 | 4/2015 |

OTHER PUBLICATIONS

PCT/US2014/058665, "International Application Serial No. PCT/US2014/058665, International Search Report and Written Opinion mailed Dec. 17, 2014", Intralinks, Inc., 11 Pages.

\* cited by examiner

*Primary Examiner* — Brandon Hoffman
*Assistant Examiner* — Nega Woldemariam
(74) *Attorney, Agent, or Firm* — GTC Law Group PC & Affiliates

(57) ABSTRACT

According to at least one example embodiment, a method and corresponding content protection server for managing access to electronic content comprise retrieving access policies, or permissions, associated with a content item from a corresponding content sharing application, or rights issuer. The access policies are translated into a format recognizable by a digital rights management (DRM) engine, and forwarded to the DRM engine. The translated access policies are then provided by the DRM engine to a client device where the translated access policies are enforced in managing any potential access to the content item.

20 Claims, 3 Drawing Sheets

METHOD AND APPARATUS FOR MANAGING ACCESS TO ELECTRONIC CONTENT

BACKGROUND OF THE INVENTION

Digital content sharing is a convenient and easy way to exchange information between people, organizations, companies, or any other entities. However, sharing content over digital media, such as the Internet, may expose the content to un-trusted users. Many digital rights management (DRM) technologies provide solutions to limit access to shared content to trusted users.

SUMMARY OF THE INVENTION

A typical digital rights management (DRM) system includes a rights issuer configured to create and provide access policies, or permissions, associated with corresponding content items, and a DRM engine that typically encrypts content items and manages users and access policies. The typical DRM system also includes DRM clients, or agents, for enforcing access policies, associated with content items, within a client device. Within each DRM system, the corresponding rights issuer, DRM engine, and DRM agents are expected to comply with proprietary, or standardized, specification requirements that are specific to the DRM system. As such, DRM systems employing distinct DRM technologies are not interoperable.

Also, once access policies are provided to a DRM client device, management of the access policies is handled by the DRM engine. Dynamically modifying the rights policies once they are delivered to a client device is either impossible, or calls for an active role by the rights issuer to synchronize with the DRM engine and/or the DRM agents in order to revoke previous access policies and provide new ones.

In the following embodiments of a DRM system with a middle layer enabling support of, and interoperability between, different DRM technologies are presented by applicants. In the DRM system presented, DRM engines do not perform encryption, user management, nor access policies' management. Each time, a protected content item is opened on a client device, corresponding access policies are requested from a corresponding DRM engine. The DRM engine forwards the request to a content protection server. The content protection server retrieves the access policies from the rights issuer, and provides the retrieved access policies to the DRM engine in a format readable by the DRM engine. The access policies are then provided to the DRM client, or agent, to be enforced in the client device. As such, the rights issuer is enabled to dynamically modify access policies at any time. At each attempt to access the content item, the most recent access policies are retrieved from the rights issuer and enforced at the client device.

According to at least one example embodiment, a method and corresponding content protection server for managing access to electronic content comprise retrieving access policies, or permissions, associated with a content item from a corresponding content sharing application, or rights issuer. The access policies are translated into a format recognizable by a digital rights management (DRM) engine, and forwarded to the DRM engine. The translated access policies are then provided by the DRM engine to a client device where the translated access policies are enforced in managing any potential access to the content item.

In order to retrieve the access policies, the content protection server receives information identifying the content item from the client device. The content server then requests from the corresponding content sharing application, or rights issuer, the access policies associated with the content item based on the received information identifying the content item. In response to the request, the rights issuer, or the content sharing application, sends the requested access policies to the content protection server.

Retrieving the access policies includes receiving the access policies in a format recognizable by the content protection server. The access policies are translated into the format recognizable by the content protection server by an interface associated with the content sharing application, or rights issuer. The access policies in the format recognizable by the content protection server are then translated, by the content protection server, into a format readable, or recognizable, by the DRM engine.

Prior to retrieving the access policies, the content protection server receives, from the DRM engine, user credentials for authentication. The content protection server may handle the authentication of user credentials locally. Alternatively, the content protection server forwards the user credentials to the content sharing application for authentication. Once user credential are successfully authenticated, the content protection server receives information identifying the content item. The content sharing application, or system, is identified based on the received information identifying the content item.

Also, prior to retrieving the access policies, the content item is encrypted by the content protection server. Encrypting the content item includes receiving the content item from the content sharing application. An encryption protocol is then determined based on a type of the received content item. The received content item may be pre-processed based on the content item format. The content item is then encrypted based on the determined encryption protocol. The content item may further be post-processed based on the content item format. The encrypted content item is provided the to the user/client device. The content protection server also causes the encrypted content item to be registered at the DRM engine.

The access policies are dynamic. That is, on a subsequent attempt to access the content item at user device, the access policies are automatically retrieved again from the content sharing application, translated and provided to the DRM engine by the content protection server. So, any modification of the access policies by the content sharing application, or rights issuer, are included in the access policies retrieved by the content protection server upon a subsequent attempt to access the content item.

According to at least one example implementation, the content protection server is coupled to two or more DRM engines. The content protection server is also coupled to two or more content sharing applications, or systems.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Digital rights management (DRM) technologies provide solutions for secure content sharing, electronic content protection, and user access control to electronic content. With such solutions, an entity may be able to manage who has the right to access content circulated over the Internet or other digital media, and what kind of rights are granted to each potential user. Electronic content herein refers to one or more media objects, such as, music files, images, video files, text documents, or the like.

In a typical DRM system, a rights issuer issues access rights, or permissions, associated with a content item, or object, and provides the access rights to a user device. The DRM rights are enforced at the receiving user device through a DRM client, or agent. A DRM engine coupled to the DRM clients is configured to encrypt content items and manage users and access policies. Each DRM engine typically has proprietary, or standardized, architecture, protocols, encryption methods, policy management and processing methods. The corresponding DRM agents and Rights issuer are expected to be compliant with the specificities of the DRM engine and the DRM technology employed by the DRM system in general. As such, DRM system employing distinct DRM technologies are not interoperable. In order for a user device to consume protected content by a given DRM system, the user device is expected to have a complying DRM agent.

Some typical DRM systems do not enable dynamic access policies, and, as such, access policies may not be modified once they are distributed to DRM agents. Other DRM systems require synchronization between the rights issuer and the DRM engine.

Figure 1:
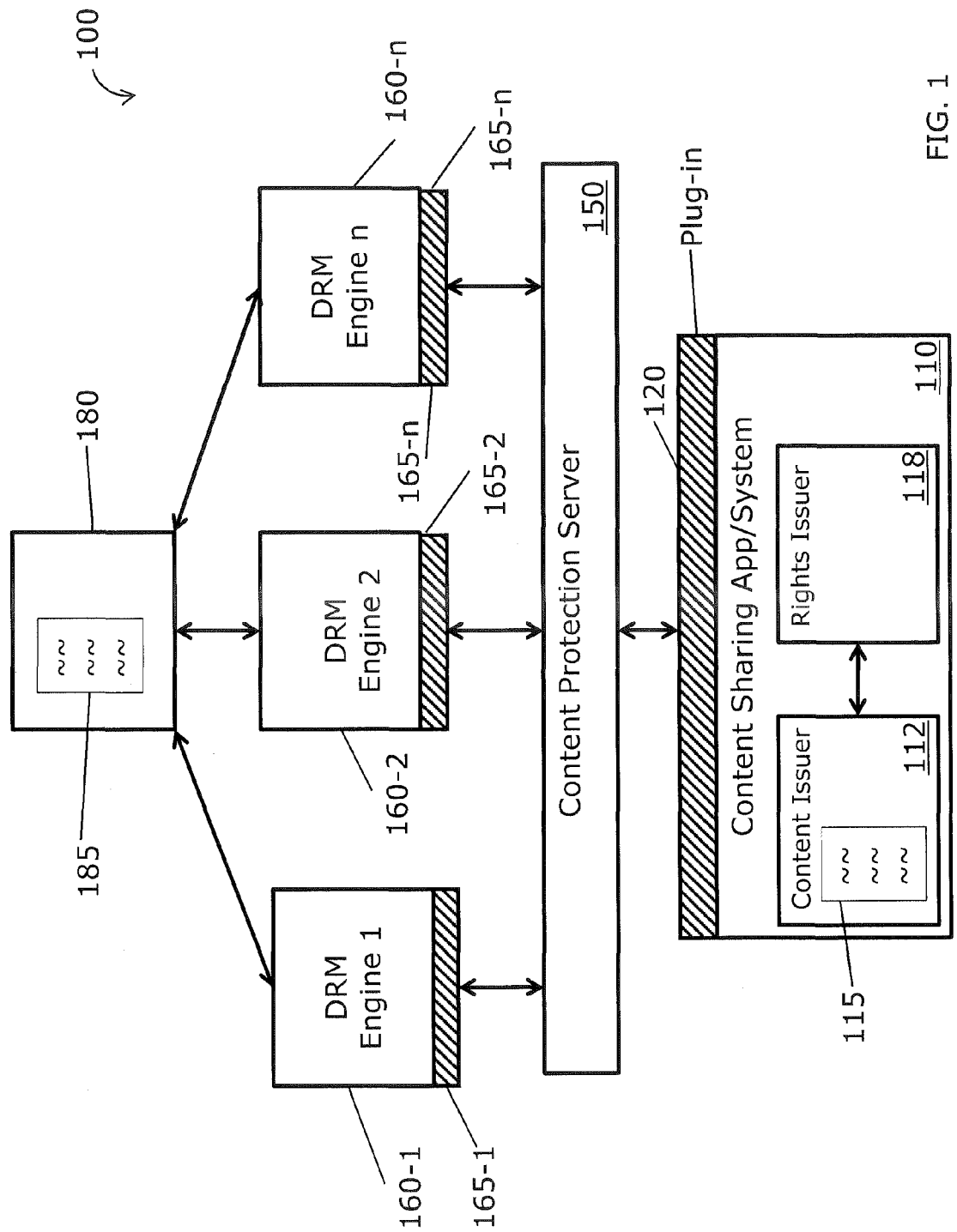
FIG. 1 is a block diagram illustrating a digital rights management (DRM), or Information Rights Management (IRM), system 100, according to at least one example embodiment.

FIG. 1 is a block diagram illustrating a digital rights management (DRM), or Information Rights Management (IRM), system 100, according to at least one example embodiment. The DRM system 100 includes a content sharing system, or application, 110, a content protection server 150, one or more rights management services (RMS), servers, also known as DRM engines, e.g., 160-1-160-n, and a content rendering system, or application, 180. The content sharing system 110 is configured to share content 115 with client users. Specifically, the content sharing system is configured to circulate protected content 185 to user/client devices 180 through the content protection server 150 and a RMS server, or a DRM engine, e.g., 160-1, 160-2, . . . , or 160-n.

The content sharing system, or application, 110 is configured to act as a content issuer and a rights issuer. For example, the content sharing system 110 includes a content issuer module 112 and a rights issuer module 118. The content issuer module 112 is configured to circulate content 115 over the Internet, or any other communications medium, for sharing with potential users. The rights issuer module 118 is configured to issue permissions, or access rights, in association with content 115 for sharing by the content issuer module 112 with client users. The content issuer module 112 may include, or be coupled to, a content repository containing content 115 for sharing. The content issuer module 112 and the rights issuer module 118 may reside on the same device, e.g., enterprise server, personal computer, or the like, or on different devices.

According to at least one example embodiment, the content protection server 150 is coupled to one or more content sharing systems 110 and one or more RMS servers, or DRM engines, e.g., 160-1-160-n. The content protection server 150 represents an intermediate layer, between the DRM engines 160-1-160-n and the content sharing system(s) 110, that is agnostic to the DRM engines 160-1-160-n and the content sharing system(s) 110. The middle layer is configured to normalize content processing, irrespective of the content type, and handle content encryption instead of the DRM engines 160-1-160-n. Specifically, during a publishing phase, the content protection server 150 is configured to encrypt the content 115, irrespective of the corresponding content type, and provide a corresponding protected, or encrypted, copy 185 of the content to the content sharing system 110. The content sharing system 110 may then share the encrypted content 185 with client users.

Also, when the client user attempts to access the encrypted content 185, the content protection server 150 acts as an inter-operability layer between a RMS server, or a DRM engine, e.g., 160-1, 160-2, . . . , or 160-n, and the content sharing system 110 associated with the protected content 185. In other words, during a consumption phase of the protected content 185, the content protection server 150 translates policy objects received from the content sharing system 110, or the rights issuer module 118, into a format, or language, recognizable by the DRM engine, e.g., 160-1, 160-2, . . . , or 160-n.

According to at least one example embodiment, the content protection server 150 provides an interoperability interface between fundamentally different DRM technologies, at the protection layer. That is, the format and/or language employed in creating the access rights, or permissions, by the rights issuer 118 and the DRM technologies supported by a given DRM engine may be fundamentally different and non-compliant to each other's requirements, yet, the content protection server 150 provides an interface that enables interoperability between the given content sharing system 110 and a given DRM engine.

The content protection server 150 is configured to support multiple DRM technologies and corresponding DRM engines 160-1-160-n. For example, the RMS servers, or DRM engines, 160-1-160-n include a "LiveCycle" server from Adobe, a Microsoft RMS server, and/or other proprietary or standardized DRM engines. The content protection server 150 is also configured to support multiple content sharing systems 110.

According to at least one example embodiment, the DRM engines 160-1-160-n are used to register documents and reroute access requests from client devices to the content protection server 150. The DRM engines 160-1-160-n do not perform content encryption, user management, nor policy management. However, the content protection server 150 may employ software development kits (SDKs) to match the particular DRM technology for that DRM engine. Encryption is done at the content protection server side, yet the employed encryption techniques are expected to be compliant with the techniques supported by the DRM engines. When a client user attempts to open the protected content 185, the user device 180 sends a request for corresponding DRM policies, or permissions, is sent to a corresponding DRM engine. The DRM engine forwards the request to the content protection server 150, which requests the DRM policies, or permissions, from the content sharing system 110, e.g., from the policy issuer 118. Upon receiving the requested access policies, the content server 150 provides the access policies to the DRM engine, which provides them to the user device to be enforced. In response to each subsequent attempt to open the content item again, the same process is repeated and access policies are obtained again from the content sharing application 110, or the rights issuer 118. Such scheme enables the content sharing application 110, or the rights issuer 118 to dynamically manage and control the access policies with the certainty that the latest updated version of the access policies is employed by a user device attempting to access the content item. For example, the content sharing application 110, or rights issuer 118, may update access policies associated with content items once the content items and the corresponding policies have been distributed. The access to already distributed content items may also be revoked by the content sharing application 110, or rights issuer 118.

Figure 2:
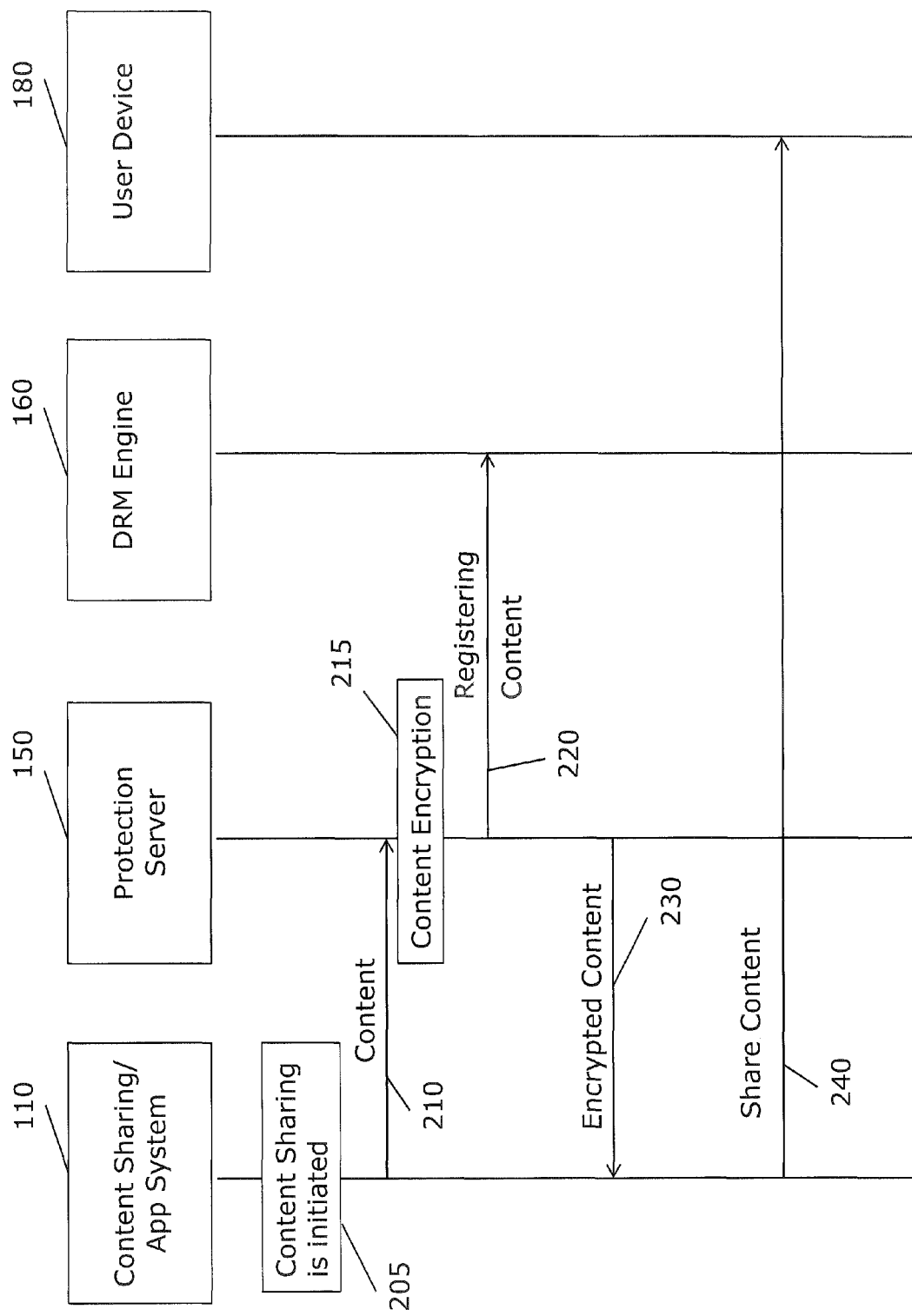
FIG. 2 is a signaling flowchart illustrating communications between different entities of the DRM system during a publishing phase, according to at least one example embodiment.

FIG. 2 is a signaling flowchart illustrating communications between different entities of the DRM system 100 during a publishing phase, according to at least one example embodiment. The publishing phase refers to the protection and circulation, or sharing, of a content item. Upon initiating a process of sharing a content item 115, at 205, the content item is sent 210 to the content protection server 150. Initiating the process of sharing, or circulating, a content item includes, for example, attempting to attach the content item to an email, attempting to upload or send the content item to a non-secure device, or the like. The content protection server 150 determines an encryption protocol based on the type and/or format of the content item. For example, for a Microsoft Office document, the content protection server selects an encryption protocol that is supported by Microsoft rights management services (MS RMS). However, for a PDF document, an encryption protocol supported by Adobe LiveCycle RMS. The content item 115 is then encrypted according to the determined encryption protocol by the content protection server 150 at 215. The content protection server causes the encrypted content item 185 to be registered at a corresponding DRM engine at 220. For example, if the content item 115 is a Microsoft Office document, then the corresponding DRM engine is a Microsoft RMS server. If the content item 115 is a PDF document, then the corresponding DRM engine is an Adobe RMS server. According to example implementation, the content protection server 150 sends a publishing license identification (ID) and information indicative of existence access policies associated with content item to the DRM engine for registering the content item. At 230, the encrypted content item 185 is sent to the content sharing application 110. At 240, the content sharing application 110, or the content issuer 112, shares the encrypted content item 185 with one or more user device 180. For example, the content sharing application 110 may send the encrypted content item 185 to the one or more user devices 180. The content sharing application 110 may, alternatively, make the encrypted content item 185 available to the one or more user devices 180, for example, by uploading the encrypted content item 185 on the internet.

Figure 3:
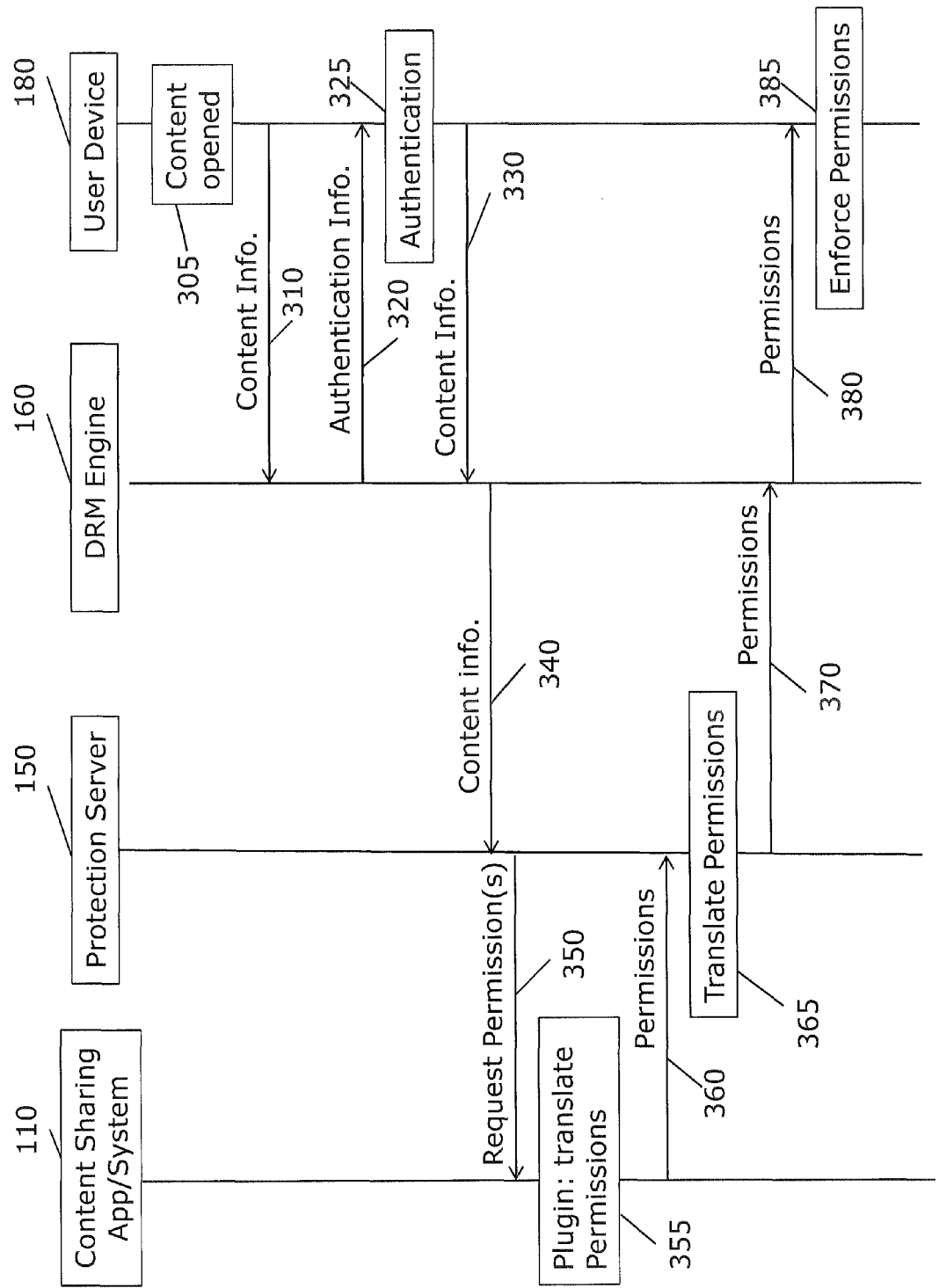
FIG. 3 is a signaling flowchart illustrating communications between different entities of the DRM system during a consumption phase, according to at least one example embodiment.

FIG. 3 is a signaling flowchart illustrating communications between different entities of the DRM system during a consumption phase, according to at least one example embodiment. Once the encrypted content item 185 is opened, at 305, in the user device 180, information identifying the encrypted content item 185 is sent at 310 to a corresponding DRM engine 160. In this case, the corresponding DRM engine 160 may be determined based on a rendering application used to open the encrypted content item 185 or DRM agent associated with the encrypted content item 185. For example, Microsoft Office will automatically contact a MS RMS server. The corresponding DRM engine 160 responds to the user 180, at 320, with authentication information that is determined, for example, based on the information identifying the encrypted content item 185. The authentication information indicates what kind of authentication is required for the encrypted document item 185.

At 325, the user device 180 provides an authentication window or session for the user, and the user is requested to enter his user credentials. The user credentials are then sent to the content protection server 150 for authentication. According to one example implementation, the content protection server 150 may handle the authentication locally if, for example, the content protection server 150 maintains a database of authentic user credentials for each user. Alternatively, the user credentials received by the content protection server are sent to the content sharing application 110 for authentication. Once user credentials are authenticated, an indication of successful authentication is sent to the user device 180. Once the user credentials are authenticated at 325, the user device 180 sends, at 330, the information identifying the encrypted content item 185 to the DRM engine 160 again. The user device 180 may also send a notification to the DRM engine 160 indicating that user credentials are successfully authenticated.

At 340, the DRM engine 160 forwards the information identifying the encrypted content item 185 to the content protection server 150. The content protection server 150 sends a request, at 350, to the content sharing application 110 requesting access policies, or permissions, based on the information identifying the encrypted content item 185. The content protection server 150 stores, for example, a database mapping information identifying content items to corresponding content sharing applications 110, rights issuers, or corresponding plug-in modules 120. At 355 the plug-in module 120 translates the requested access policies into a format, or language, recognizable by the content protection server 150, and the translated access policies are sent at 360 to content protection server 150. Alternatively, the translation to a format, or language, recognizable by the content protection server 150 may be performed by a translation module within, or associated with, the content protection server 150.

The plug-in module 120 resides at the content sharing application 110. The plug-in module 120 is implemented, for example, as an application on top, a plug-in, an extension of the content sharing application 110, or the like. The plug-in module 120 translates 355 permissions, or DRM policies, specific to the content sharing application 110, or the corresponding rights issuer 118, into a format, or language, recognizable by the content protection server 150. The content protection server 150 stores information that enables mapping the encrypted content item 185 to a corresponding content sharing application 110, or plug-in module 120. Upon receiving the be able to identify what content sharing application or plug-in to call for a specific document in the authorization phase The content protection server 150 translates, at 365, the access policies into a format, or language, recognizable by the DRM engine 160, and sends 370 the access policies in the format, or language, recognizable by the DRM engine 160 to the DRM engine 160. The DRM engine forwards 380 the access policies received to the user device 180. The access policies are enforced 385 in the user device 180, for example, by a corresponding DRM agent.

The process described with respect to FIG. 3 is performed again with each subsequent attempt to access the encrypted content item 185 in the user device 180, and each time, the latest version of the access policies is obtained from the content sharing application and enforced at the user device 180, therefore enabling dynamic access policies that are managed by the content sharing application 110, or the rights issuer.

The content protection server 150 includes a set of application programming interfaces (APIs), which provide to third parties a public interface for accessing functionalities associated with the content protection server. Such APIs include analytics APIs, policy management APIs, document management APIs, and user management APIs. Analytics APIs provide third parties with access to a set of functions that upon use by a developer of a content sharing application 110 return a set of data which represents the information that a user device conveyed to a DRM system regarding usage of a content item. Policy management APIs provide a third party with access to a set of functions that enables the developer of a content sharing application to manage local policies or access rights. Document management APIs provide access to a third party to a set of functions that enables a developer of a content sharing application through a customization module to encrypt content items. The user management APIs provide access to the a third party to a set of functions that helps a developer of a content sharing application to implement functionality related to managing users in a DRM system 100.

The content protection server 150 has queuing services built-in that enable processing one or more content items, received for encryption, asynchronously and in a scalable fashion. The content protection server 150 also provides encryption services including algorithms and DRM specific protocols for encrypting content items received by the content protection server 150. The content protection server 150 is also configured to process documents. Specifically, the content protection server 150 is configured to provide logic and algorithms to pre-process or post-process content items that are received by the content protection server 150 before or after encryption.

According to at least one example embodiment, the content protection server 150 is computer cloud server. Alternatively, the content protection server 150 is computer server residing on the same network as the content sharing application 110. According to yet another example embodiment, some modules of the content protection server, e.g., an encryption module for performing encryption, is implemented within the same computer network as the content sharing application 110, while other modules are implemented on a cloud computer server.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., that enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing digital rights management (DRM) access rights as applied to a DRM formatted content item, the method comprising:
  receiving, by a content protection server from a content sharing application, a content item and a first indicator of access rights for the content item;

formatting, by the content protection server, the content item into a DRM formatted content item based on the received first access rights indicator for the content item, wherein the DRM formatted content item is correspondingly registered with a DRM engine;

forwarding, by the content protection server to the content sharing application, the DRM formatted content item, wherein the content sharing application subsequently transmits the DRM formatted content item to a user device;

instructing the user device to request access rights from the DRM engine when the user device attempts access to the DRM formatted content item;

receiving, by the content protection server from the DRM engine, a request for access rights for the DRM formatted content item when the user device requests access rights from the DRM engine;

retrieving, by the content protection server from the content sharing application, an updated indicator of access rights associated with the content item, wherein the updated access rights indicator is updated from the first access rights indicator when access rights to the content item are modified using the content sharing application;

translating, by one of the content protection server and the content sharing application, the updated indicator of access rights retrieved into a DRM format recognizable by the DRM engine; and forwarding, from the content protection server to the DRM engine, the translated updated access rights indicator, the translated updated access rights indicator being provided by the DRM engine to a user device and employed by the user device to provide access to the DRM formatted content item.

2. The method as recited in claim 1, wherein retrieving the updated indicator of access rights includes: receiving information identifying the content item from the user device; requesting, from the corresponding content sharing application, the updated indicator of access rights associated with the content item based on the received information identifying the content item; and receiving the access rights requested.

3. The method as recited in claim 2, further comprising determining the corresponding content sharing application based on information accessible to the content protection server, the accessible information mapping the information identifying the content item to the corresponding content sharing application.

4. The method as recited in claim 1, wherein translating the updated indicator of access rights retrieved into a DRM format recognizable by the DRM engine includes: first translating the updated indicator of access rights retrieved into a format associated with the content protection server; and translating the access rights in the format associated with the content protection server into the DRM format recognizable by the DRM engine.

5. The method as recited in claim 1 further comprising: receiving an instance of user credentials; and authenticating the received instance of user credentials based on stored information indicative of a corresponding authentic user of the user device.

6. The method as recited in claim 1 further comprising: receiving an instance of user credentials; and forwarding the received instance of user credentials to the content sharing application for authentication of a user of the user device.

7. The method as recited in claim 1, wherein the content protection server is a cloud server.

8. The method as recited in claim 1, wherein the content protection server resides in a same network as the content sharing application.

9. The method as recited in claim 1 wherein the DRM formatted content item is encrypted.

10. The method as recited in claim 9, wherein the DRM formatted content item is encrypted by: receiving the content item from the content sharing application; determining an encryption protocol based on a type of the received content item; pre-processing the content item by employing one or more pre-determined logic based on the content item format encrypting the content item based on the determined encryption protocol; and post-processing the content item by employing one or more pre-determined logic based on the content item format.

11. An apparatus for managing access to electronic content, the apparatus comprising: a processor; and a memory with computer code instructions stored thereon, the processor and the memory, with the computer code instructions stored thereon, being configured to: receive from a content sharing application, a content item and a first indicator of access rights for the content item;

format the content item into a DRM formatted content item based on the received first access rights indicator for the content item, wherein the DRM formatted content item is correspondingly registered with a DRM engine;

forward to the content sharing application, the DRM formatted content item, wherein the content sharing application subsequently transmits the DRM formatted content item to a user device;

instruct the user device to request access rights from the DRM engine when the user device attempts access to the DRM formatted content item;

receive from the DRM engine, a request for access rights for the DRM formatted content item when the user device requests access rights from the DRM engine;

retrieve from the content sharing application, an updated indicator of access rights associated with the content item, wherein the updated access rights indicator is updated from the first access rights indicator when access rights to the content item are modified using the content sharing application;

translate the updated indicator of access rights retrieved into a DRM format recognizable by the DRM engine; and forward, to the DRM engine, the translated updated access rights indicator, the translated updated access rights indicator being provided by the DRM engine to a user device and employed by the content rendering system to provide access to the DRM formatted content item.

12. The apparatus as recited in claim 11, wherein in retrieving the updated indicator of access rights, the processor and the memory, with the computer code instructions stored thereon, being further configured to: receive information identifying the content item from the content rendering system; request, from the corresponding content sharing application, the updated indicator of access rights associated with the content item based on the received information identifying the content item; and receive the access rights requested.

13. The apparatus as recited in claim 12, wherein in retrieving the updated indicator of access rights, the processor and the memory, with the computer code instructions stored thereon, being further configured to determine the corresponding content sharing application based on information accessible to the content protection server, the accessible information mapping the information identifying the content item to the corresponding content sharing application.

14. The apparatus as recited in claim 11, wherein in translating the updated indicator of access rights into the DRM format recognizable by the DRM engine, the processor and the memory, with the computer code instructions stored thereon, being further configured to: first translate the updated indicator of access rights retrieved into a format associated with the apparatus; and translating the access rights in the format associated with the apparatus into the DRM format recognizable by the DRM engine.

15. The apparatus as recited in claim 11, wherein the apparatus is a cloud server.

16. The apparatus as recited in claim 11, wherein the apparatus resides in a same network as the content sharing application.

17. The apparatus as recited in claim 11, wherein the DRM formatted content item is encrypted.

18. The apparatus as recited in claim 17, wherein the processor and the memory, with the computer code instructions stored thereon, are configured to:
  receive the content item from the content sharing application; determine an encryption protocol based on a type of the received content item; and encrypt the content item based on the determined encryption protocol.

19. The apparatus as recited in claim 11, wherein the apparatus being coupled to two or more DRM engines.

20. The apparatus as recited in claim 11, wherein the apparatus being able to be coupled with two or more user devices or content sharing applications.

* * * * *